(12) United States Patent
Rives

(10) Patent No.: X4610
(45) Date of Patent: Dec. 22, 1826

(54) LOTTERIES, DRAWING

(76) Inventor: John C. Rives

John C Rives
Letters Patent

The Schedule referred to in these Letters Patent, and making part of the same, containing a description in the words of the said John C Rives himself of his improvement in the mode of drawing Lotteries. —

In this system of drawing Lotteries the tickets are made or numbered by changing as often as it can be done the numbers figures letters marks or characters and on a certain number of decimal points. If numbers are used, compounded of two figures, then each number must be separated by a dot or mark; but if single or simple figures, letters marks or characters are used then there is no necessity for such operation. Each and every ticket in a scheme must have on it the same number of numbers figures letters marks or characters. The number of numbers figures letters marks or characters used in making or numbering the tickets multiplied into itself as often as there are decimal points on a Ticket or in other words as often as there are numbers figures letters or marks or characters on a ticket will give the number of Tickets that can be made with these numbers figures letters marks or characters. For example if twenty five numbers figures letters marks or characters are changed on three decimal points or in other words if three of the twenty five numbers figures letters . . . . . or characters are put on a ticket the third power of twenty five (15625) is the number of tickets that can be made. If thirty be changed on three decimal points, the third power of thirty (27000) is the number of Tickets that can be made. If thirty three be changed on three decimal points the third power of thirty three (35937) is the number of Tickets than can be made: If ten be changed on four decimal points the fourth power of ten (10.000) is the number of tickets that can be made: If twelve be changed on four decimal points the fourth power of twelve (20.736) is the number of Tickets that can be made; If eight be changed on five decimal points, the fifth power of eight (32.768) is the number of tickets that can be made. A complete Table made out according to this system will show the following results Viz. It will contain an equal number of each of the numbers, figures, letters
marks, or characters used, : They will be equally distributed :
on all the decimal points : The same numbers, figures, let-
ters marks, or characters that are found in reading or enu-
merating from left to right, will also be found in reading
or enumerating from right to left. The position or relation
that any number, figure letter, mark or character, bears
to another will be found to be maintained or reoccupied - - by
each of the others. To draw a Lottery when the Tickets
are made or numbered as above described, there must be
put into the wheel, such an one as is usually made use of.
in drawing lotteries, as many of each of the numbers, figures
letters, marks. or characters used in making the tickets
as there are decimal points, or numbers, figures, letters.
. . . . . . or characters on a ticket. If ten figures, num-
bers letters marks or characters are used in making or
numbering the tickets, and four of them are put on each
ticket, then four of each must be put into the wheel which
together will make forty: For example suppose the ten figures
in arithmetic were used, and four put on each ticket, then
there would be put into the wheel, four 0's four 1.s. four 2.s
four 3.s. four 4's four 5.s four 6.s. four 7.s four 8.s. four
9.s. This one example is thought a sufficient explanation
as regards putting the numbers figures, letters, marks or characters
into the wheel. There must be drawn from the wheel as
many numbers figures, letters, marks, or characters, as there
are numbers, figures, letters, marks, or characters on a ticket.
which will decide which of the tickets are blanks, and which
are prizes. and also what prize or prizes each ticket is en-
titled to. or if it should be thought best the capital prize
might be decided by drawing from the wheel as many number
figures letters, marks or characters, as there are on a ticket for
each of them. The secondary prizes by drawing from the wheel one ballot less than was drawn for each capital prize; the next grade of prizes by drawing from the wheel one ballot less than was drawn to decide the secondary prizes and so on drawing one ballot less each time, till every grade of prizes were drawn for. In drawing on this system, when a ballot is drawn from the wheel its number, figure, letter, mark, or character, must be taken; and the ballot again put into the wheel before another one is drawn. This is done to give all those Tickets that have two or more numbers figures, letters, marks, or characters, on them alike an equal chance with those which have each of their numbers, figures, letters, marks, or characters, different. When every grade of prizes in a scheme are drawn for, it is not necessary that the ballots should be returned to the wheel. It is probable that the prizes would be distributed more regularly if the ballots were not returned to the wheel.

Witnesses
Alex<sup></sup>r McIntire
Wm Elliot

John C Hives

A few days say not exceeding five after the above specification was sworn to and deposited in the Patent Office I discovered that it was not necessary to put into the wheel more than one of the figures letters, or characters, used in making the tickets. Washington 11th Dec 1826

Witnesses
Wm Elliot
Alexr McIntire

John C Hives

Exd. [illegible]

(1020 Words)